United States Patent [19]

Ohlson et al.

[11] 4,132,897

[45] Jan. 2, 1979

[54] FILM-CASSETTE HOLDER FOR AN X-RAY APPARATUS

[76] Inventors: Eric Ohlson, Ankdammsgatan 29, Solna, Sweden, 171 43; Carl-Eric Ohlson, Framnäsbacken 7, Solna, Sweden, 171 42

[21] Appl. No.: 744,745

[22] Filed: Nov. 24, 1976

[30] Foreign Application Priority Data

Nov. 26, 1975 [SE] Sweden .............................. 7513314

[51] Int. Cl.² ............................................ G03B 41/16
[52] U.S. Cl. ................................................... 250/468
[58] Field of Search ............... 250/468, 470, 471, 521, 250/451

[56] References Cited

U.S. PATENT DOCUMENTS

| | | | |
|---|---|---|---|
| 2,264,410 | 12/1941 | Schier | 250/451 |
| 2,598,529 | 5/1952 | Fritz | 250/468 |
| 3,694,653 | 9/1972 | Allard | 250/468 |
| 3,920,997 | 11/1975 | Munch | 250/468 |
| 3,986,034 | 10/1976 | Wittkopp | 250/468 |

*Primary Examiner*—Craig E. Church

*Attorney, Agent, or Firm*—Fleit & Jacobson

[57] ABSTRACT

A film-cassette holder for an X-ray apparatus is provided with means for removeably mounting the film-cassette in the holder in the correct position therein. The mounting means comprises spring catches which, when the cassette is inserted into the holder, automatically hold said cassette in its correct position in the holder, and which are arranged to permit the cassette to be removed from said holder with the use of only one hand. The cassette is arranged to be released by exerting pressure thereon perpendicularly to the insertion direction followed by a pulling movement in a direction opposite to the insertion direction. The cassette holder is provided with a grid pocket having means for removeably mounting a grid in its correct position in the pocket, spring catches being adapted automatically to mount the grid upon insertion of the grid into said pocket, and adapted to permit removal of the grid upon manipulation of said grid with one hand. Further, the cassette holder has a means for easy removeable mounting to a cassette holder arm.

4 Claims, 7 Drawing Figures

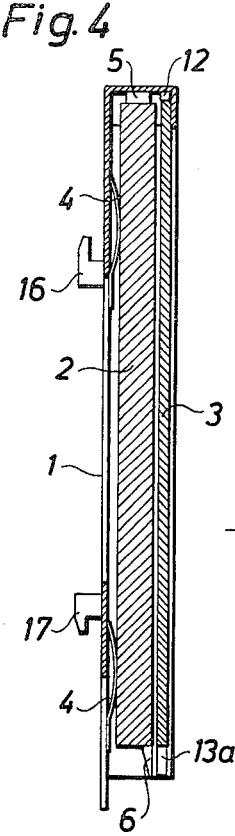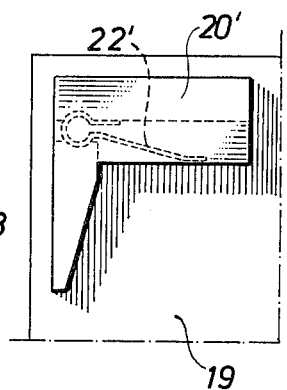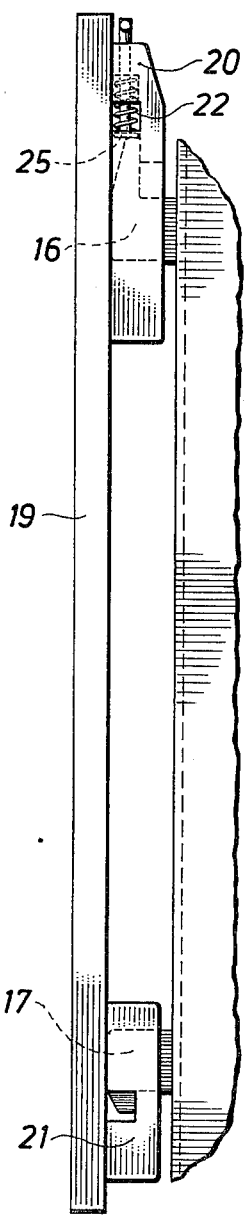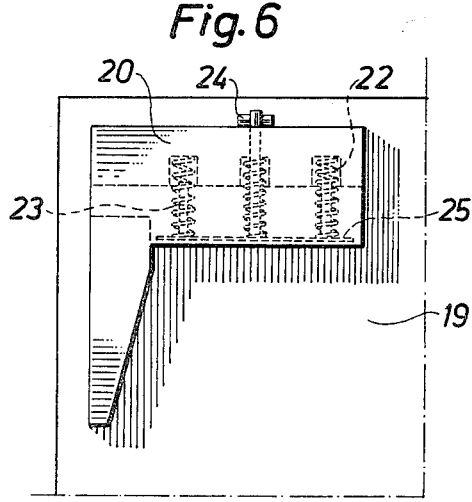

FILM-CASSETTE HOLDER FOR AN X-RAY APPARATUS

The present invention relates to a film-cassette holder arranged to be mounted on the frame of an X-ray apparatus and having attachment means which removeably secure a cassette in the holder in a predetermined position of alignment therein.

In U.S. Pat. No. 2,807,726 (Scholz) and German patent 121,804 (Krugener) there are described previously known such film-cassette holders which, however, are rather difficult to handle. Swiss Pat. No. 307,352 (General Aniline & Film Corporation) describes a film-cassette holder for a conventional camera having a release mechanism comprising two fingeractuated members to be pressed towards each other.

An object of the invention is to provide a film-cassette holder of the type which will permit a cassette to be mounted reliably in the holder in a correct position of alignment therein, irrespective of any rotary movement of the frame, and which will permit cassettes to be changed rapidly and simply. A film-cassette holder according to the invention is mainly characterised by the fact that the cassette-mounting means comprises a spring catch arrangement which, when a cassette is introduced into the holder, automatically aligns the cassette therein and which is adapted so that the cassette can be freed from its mounting by manipulating the cassette proper with one hand.

The invention enables the operator of an X-ray apparatus to hold a fresh cassette in one hand and to remove a spent cassette from the holder with the other. The fresh cassette is then inserted into the holder and is automatically secured immediately in its correct position therein. Thus, a cassette holder constructed in accordance with the invention enables a cassette to be changed in a rapid and simple manner.

In practice, the cassette holder is suitably constructed so that the cassette can be released by exerting a pressure at right angles to the insertion direction, followed by a pulling movement in a direction opposite to said insertion direction.

A cassette holder preferred in practice and provided with a base, two side walls, each of which has a roof portion, and an end wall having a roof portion, is characterised by spring tongue-like elements arranged at said base in the region of the side walls beneath respective roof portions, said tongues being arranged to urge the cassette upwardly towards the roof portions, of which roof portions at least one exhibits a downwardly extending stop shoulder.

Such a cassette holder has no outwardly projecting parts which might impede handling of the holder or the cassettes. Despite this, a film cassette can be inserted into its correct position in the holder both quickly and simply.

The end wall of the cassette holder is conveniently provided with a spring tongue with urges the cassette outwardly against the stop shoulder.

A cassette holder of the aforementioned type, which is provided in a known manner with a pocket having means for removeably mounting a screen therein, is mainly characterised by spring catch means for automatically aligning the screen upon its insertion into said pocket, said means being arranged so that the screen can be removed from the pocket by manipulating the screen with one hand only.

Thus, such a cassette holder also enables, when necessary, a screen to be changed in a rapid and simple manner.

The spring catch means may, in practice, be constructed so that the screen is released by rotating or pivoting the same in its own plane, optionally in combination with an inward movement of the screen followed by a pulling movement.

To this end, the grid pocket may be provided on one side thereof with a longitudinally extending spring means and with an end stop at the outer end of the other side.

A return spring for the grid may be provided on the inner end-wall of the cassette.

It is desirable that a cassette holder of the type envisaged shall be capable of being removeably mounted in a simple manner to a cassette holder arm. Film-cassettes of different sizes are used, the size of the cassette used depending, inter alia, upon the part of the body to be photographed, which means that it must be possible to interchange cassette holders.

Accordingly, a cassette holder according to the invention is provided with means for removeably mounting the same onto a cassette holder arm provided with corresponding mounting means.

In this respect it is preferred that the mounting means exhibit inner and outer attachment shoulders extending in mutually opposite directions and adapted to co-operate with corresponding mounting means on the cassette holder arm, of which mounting means at least one is provided with spring means. The arrangement is suitably such that the cassette holder is mounted by means of a combined pivoting and displacement movement.

Further aspects of the invention will be apparent from the following description of a preferred embodiment of the invention. The description is made with reference to the accompanying drawings.

FIG. 4 is a longitudinal sectional view through the cassette holder of FIG. 1 showing the associated film cassette and screen in their inserted positions.

FIG. 5 is a part sectional view illustrating how the cassette holder is removeably attached to a cassette holder arm associated with the frame of an X-ray apparatus.

FIG. 6 is a plan view of part of the cassette holder arm and the attachment means.

FIG. 7 is a modification of the attachment means of FIG. 6.

Figure 1:
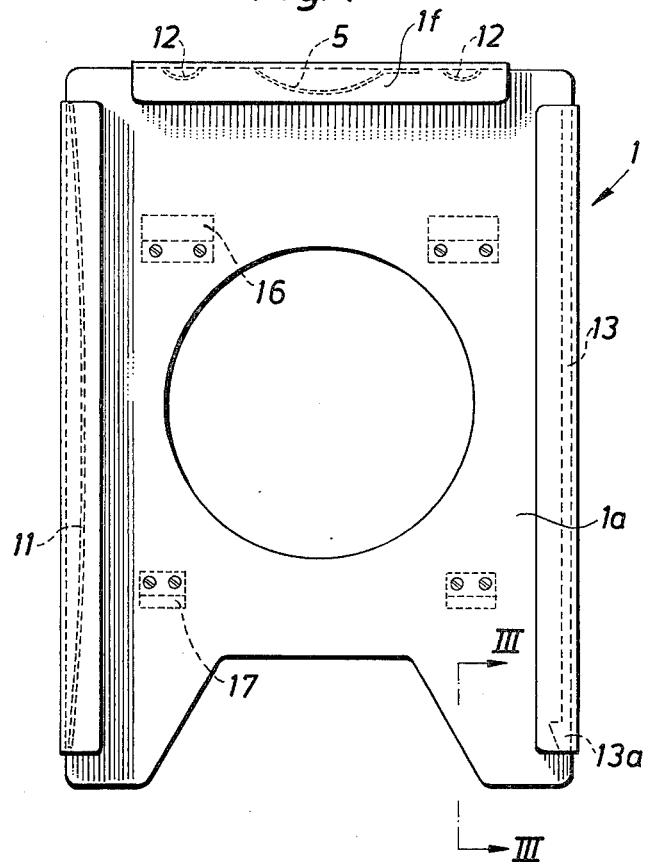
FIG. 1 is a plan view of a cassette holder according to the invention.
Figure 3:
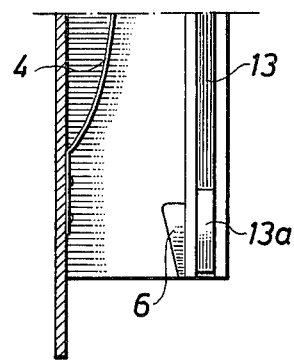
FIG. 3 is a sectional view through the line III—III in FIG. 1.
Figure 2:
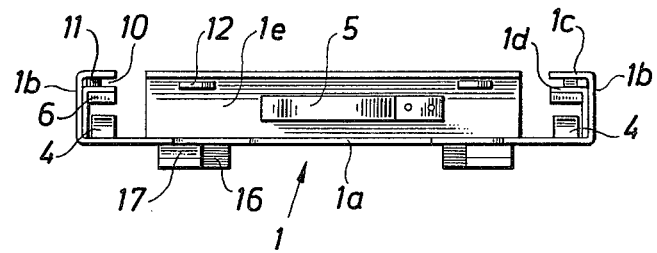
FIG. 2 is a front view of the cassette holder shown in FIG. 1.

A film-cassette holder 1 for an X-ray apparatus or machine comprises a base 1a having a circular opening arranged therein, two bent side walls 1b each of which has an upper roof portion 1c and a lower roof portion 1d. The cassette also has an end wall 1e having a roof portion 1f.

Adjacent each side wall 1b there is attached to the base 1a beneath the roof portions 1d a spring tongue 4, each of said springs being arranged to urge an X-ray film-cassette 2 (see FIG. 4) inserted into the holder upwardly against the roof portions 1d.

The end wall 1f is also provided with a spring tongue 5 which urges the film cassette outwardly towards a downwardly extending stop shoulder 6 arranged adjacent the outer end of the roof portions 1d.

The roof portions 1c, 1d, define therebetween an intermediate pocket 10 which permits the insertion of a grid 3 having the form of a plate having strips of lead or a corresponding X-ray screening material arranged thereon.

In the left screen pocket 10 there is arranged a longitudinally extending spring means, whilst the right screen pocket 10 accommodates an insert 13 of DELRIN or corresponding material provided with an end stop 13a.

The reference 12 indicates two return springs mounted adjacent the end wall 1e, said return springs being for the grid 3.

When a film cassette is inserted into the holder 1, the spring tongues 4 will urge the cassette upwards against the roof portions 1b. The forward end of the cassette will engage the spring tongue 5, whereupon further pressure inwards will cause the stop member 6 to snap behind the rear end of the cassette. The cassette is then automatically aligned in its correct position in the holder and held therein.

When the cassette is to be removed, the rear end of the cassette is gripped in one hand and pressed downwardly against the action of the spring tongues 4, and optionally slightly inwardly against the action of the spring tongue 5. When the upper portion of the cassette is free of the stop shoulder 6, the cassette can be readily withdrawn and a further cassette inserted. Thus, in this way a film-cassette can be inserted into the holder and removed therefrom with only one hand.

In a similar manner, when inserting a grid into the pocket 10, the grid is automatically locked by the cooperation between the left spring member 11, the inner return spring means 12 and the outer end stop 13a located on the right side. The end stop 13a may comprise an integral portion of an insert 13 made of DELRIN or similar material and extending along the whole length of the pocket 10.

When the screen is to be removed, it is pivoted in its own plan against the action of the spring 11 and is optionally displaced slightly against the action of the inner spring means 12.

The front right edge of the grid will then snap past the end stop 13a, whereupon the grid can be withdrawn. In this way, grids can be inserted into and removed from the pocket with the use of only one hand.

FIGS. 5 and 6 illustrates a means which enables the cassette holder 1 to be removeably mounted in a simple manner to a cassette holder arm 19. To this end, the cassette holder is provided with inner and outer attachment shoulders 16 and 17, respectively, having attachment elements which extend at right angles to said shoulders in mutually opposite directions. The shoulders 16 co-act with attachment means 20 and 21 respectively formed in a corresponding manner on the cassette holder arm 19. The attachment means 20 has three return springs 22 arranged on a corresponding number of guide pins 23, of which the intermediate pin exhibits a stop 24. The three springs support an abutment plate 25. The cassette holder is removeably mounted on the arm 19 by simply causing the cassette holder to execute a combined pivoting and displacement movement. The cassette holder can be attached to the arm and removed therefrom by using one or both hands.

FIG. 7 illustrates a modification of the attachment means 20 of FIG. 6. Instead of the three springs 22 and the abutment plate 25 only one return spring denoted 22' is used in the attachment means 20' of FIG. 7. Spring 22' is a plate or leaf spring curved at one end and received in a suitably formed slot in the attachment means 20'. The shoulders 16 and 17, respectively, illustrated in FIGS. 4 and 5 will directly engage a leaf spring 22' so as to removeably mount the cassette holder on the arm 19.

What we claim is:

1. A film-cassette holder for an X-ray apparatus provided with means for removably mounting the film-cassette in the holder in the correct position therein, wherein the mounting means comprises a base, two side walls, each of which has a roof portion, and an end wall having a roof portion, wherein spring tongues are provided adjacent the base in the region of the side walls beneath respective roof portions, said tongues being arranged to urge the film-cassette upwardly against the roof portions, when the cassette is inserted into the holder, and which are arranged to permit the cassette to be removed from said holder with the use of only one hand, and wherein at least one of said roof portions exhibits a downwardly extending stop shoulder.

2. A film-cassette according to claim 1, wherein the end wall is provided with a spring tongue which urges the cassette outwardly against the stop shoulder.

3. A film-cassette holder for an X-ray apparatus provided with means for removably mounting the film-cassette in the holder in the correct position therein, wherein the mounting means comprises spring catches which, when the cassette is inserted into the holder, automatically hold said cassette in its correct position in the holder, and said spring catches are arranged to permit the cassette to be removed from said holder with the use of only one hand; a grid pocket having means for removably mounting a grid in its correct position in the pocket, and a longitudinal extending spring means located at one side of the pocket and an end stop means arranged at the outer end of the other side of the pocket, wherein said pocket and said spring means and said end stop means are adapted automatically to mount the grid in its correct position upon insertion of the grid into said pocket, and adapted to permit removal of the grid upon rotational movement of the grid in its own plane, and a return spring means arranged adjacent the inner end wall of said pocket for biasing said grid in the direction of removal.

4. A film cassette holder for an X-ray apparatus provided with means for removably mounting the film-cassette in the holder in the correct position therein, wherein the mounting means comprises spring catches which, when the cassette is inserted into the holder, automatically hold said cassette in its correct position in the holder, and which are arranged to permit the cassette to be removed from said holder with the use of only one hand and means for removably mounting the cassette holder to a cassette holder arm comprising inner and outer attachment shoulders which extend in mutually opposite directions and which are arranged to co-act with corresponding attachment means mounted on the cassette holder arm, of which attachment means at least one exhibits a spring.

* * * * *